(12) United States Patent
Oda et al.

(10) Patent No.: US 6,287,150 B1
(45) Date of Patent: Sep. 11, 2001

(54) POWER SOURCE (75) Inventors: Takashi Oda, Naruto; Yoshiharu Takasaki, Ibi-gun, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/504,869

(22) Filed: Feb. 16, 2000

(30) Foreign Application Priority Data

Feb. 19, 1999 (JP) .................................................. 11-041906

(51) Int. Cl.[7] .............................. H01R 33/06; H01M 2/02
(52) U.S. Cl. ............................ 439/627; 174/50; 429/100
(58) Field of Search .................................. 439/627, 366, 439/500, 222, 224; 429/158, 148, 159, 99, 100; 174/50

(56) References Cited

U.S. PATENT DOCUMENTS 5,866,276 * 2/1999 Ogami et al. .................... 429/148 X
5,900,332 * 5/1999 Marukawa et al. ................... 429/158
6,152,776 * 11/2000 Ikeda et al. ........................... 439/627

FOREIGN PATENT DOCUMENTS 10-270006   10/1998  (JP) .

* cited by examiner

Primary Examiner—Renee Luebke
(74) Attorney, Agent, or Firm—Wenderoth, Lind & Ponack, L.L.P.

(57) ABSTRACT

A power source includes a holder-case 2 and a plurality of parallel oriented power modules 1 in the holder-case 2. The power modules 1 are provided with electrode terminals 13, 14 at both ends. The holder-case 2 is of split construction having cover-casings 21 provided on both sides. At least one of the cover-casings 21 is provided with holder ribs 23. The holder ribs 23 have retaining cavities 24 which retain the power modules 1 and prevent their rotation.

28 Claims, 7 Drawing Sheets

EXAMPLE OF DIFFERENT SIZES

NEGATIVE ELECTRODE          POSITIVE ELECTRODE 414          413

FIG. 8

EXAMPLE OF THE SAME SHAPE ROTATED 45°

NEGATIVE ELECTRODE          POSITIVE ELECTRODE 814          813

FIG. 9

(POSITIVE SIDE INDICATES POLARITY)
EXAMPLE OF DIFFERENT SHAPES 1

NEGATIVE ELECTRODE     POSITIVE ELECTRODE 914        913

FIG. 10

EXAMPLE OF DIFFERENT SHAPES 2

NEGATIVE ELECTRODE     POSITIVE ELECTRODE 1014       1013

FIG. 11

EXAMPLE OF DIFFERENT SHAPES 3

NEGATIVE ELECTRODE     POSITIVE ELECTRODE 1114       1113

POWER SOURCE

This application is based on application No. 11-41906 filed in Japan on Feb. 19, 1999, the content of which is incorporated hereinto by reference.

BACKGROUND OF THE INVENTION

This invention relates to a high current power source used primarily to power a drive motor for automobiles such as hybrid and electric automobiles.

A high current power source used to power an automobile drive motor achieves high output voltage by series connection of many battery cells. This is for the purpose of increasing drive motor output. A power source used for this type of application contains a large number of battery cells to increase output electrical power. For example, this type of power source is cited in Japanese Non-examined Patent Publication No. 10-270006 issued Oct. 9, 1998. The power source disclosed in this patent application contains a plurality of power modules arranged in rows in a holder-case, and each power module has a plurality of batteries lined up in a column. The holder-case has circular through-holes in both end walls for insertion of long, slender columns of power modules. Further, intermediate walls are provided parallel to the end walls to retain power modules in a stable manner, and these intermediate walls also have circular through-holes. Power modules are inserted through the holes in both end walls and through the holes in the intermediate walls to retain the power modules in fixed positions within the holder-case.

After inserting power modules into the holder-case, both ends of the holder-case are closed off with end-plates. The end-plates have pass bars to connect respective electrode terminals established at the ends of each power module. Each power module is mechanically attached and electrically connected to pass bars by setscrew attachment at the end-plates.

In this power source, non-circular shaped nuts are provided at the positive electrode end and at the negative electrode end respectively of each power module. Power modules are attached to the pass bars of both end-plates by fastening threaded setscrews through holes provides in the pass bars to mate with the non-circular shaped nuts at power module electrodes.

The outline of a positive electrode nut and the outline of a negative electrode nut are shaped differently. The two types of electrode nuts are configured such that alignment of one on top of the other allows the shape of neither nut to completely include the other. Further, retaining grooves with shapes corresponding to the outlines of the electrode nuts are provided in the end-plates. Electrode nuts are inserted into, and held by these retaining grooves. Retaining grooves for insertion and holding of positive electrode nuts are shaped differently than retaining grooves for insertion and holding of negative electrode nuts.

This type of configuration allows simple attachment of power modules to pass bars via setscrew termination. Insertion and retention of non-circular shaped nuts into retaining grooves and attachment via setscrews prevents rotation of power modules during the attachment process. As a result, not only is the power module attachment process simplified, but development of twists between power module battery cells is prevented. Further, the problem of power module mis-insertion is solved by shaping positive electrode nuts and their corresponding retaining grooves.

Figure 1:
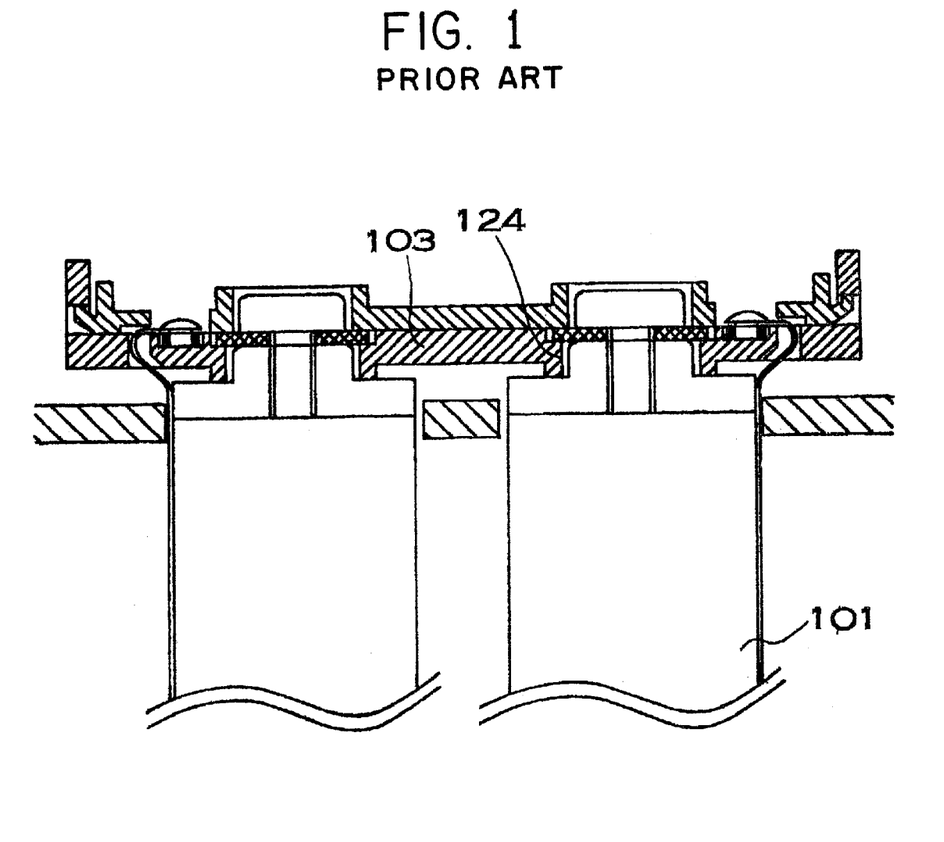
FIG. 1 is a cross-section view showing power module to end-plate connection for a prior art power source.

However, as shown in FIG. 1, since the retaining grooves 124, which correspond to the outline shapes of the electrode nuts, are formed in the end-plates 103, the power source cited in the prior art disclosure has the drawback of end-plates 103 with complicated shapes. Further, each power module 101 must be inserted into retaining grooves 124 in the end-plates 103. Lining-up and inserting all of a large number, on the order of 20, power modules 101 is extremely difficult. In addition, since a large number of power modules 101 are retained in specified fixed positions, the system has the drawback of requiring very precise location of retaining grooves 124 in the end-plates 103.

Consequently, the present invention provides a power source which simplifies end-plate shape and end-plate processing, eases the operation of power module insertion into the holder-case while preventing power module rotation, and prevents backwards insertion of power module positive and negative ends.

The above and further objects and features of the invention will more fully be apparent from the following detailed description with accompanying drawings.

SUMMARY OF THE INVENTION

The power source of the present invention holds a plurality of power modules disposed in a parallel fashion within a holder-case. Power modules are formed in a column of stick-shape by lining-up a plurality of batteries lengthwise and connecting them via connectors. Electrode terminals are provided at both ends of the stick-shaped power modules. The holder-case is split and configured with cover-casings disposed on both sides. The cover-casing on at least one side has holder ribs established, and the holder ribs are characterized by retaining cavities, which hold the power modules in place and prevent power module rotation.

In addition, holder ribs are established in the holder-case at positions corresponding to the electrode terminals provided at both ends of the power modules. Holder rib retaining cavities are characterized by retaining electrode terminals and preventing power module rotation during power module loading into the holder-case.

Electrode terminals provided at both ends of a power module comprise a positive electrode at one end and a negative electrode at the other end, and these positive and negative electrodes are formed in different shapes. Likewise, holder rib retaining cavities are characterized by their formation in different shapes corresponding to the electrode terminal shapes.

Further, retaining cavities which hold power module positive electrodes cannot hold power module negative electrodes, and retaining cavities which hold power module negative electrodes cannot hold power module positive electrodes. This configuration has the characteristic that backwards insertion of power modules is prevented.

A power source of the type described above has holder ribs established in the holder-case and has retaining cavities formed in the holder ribs to retain power module electrode terminals. This eliminates the need for retaining grooves in end-plates, which close off the holder-case, and allows simplification of end-plate shape. In addition, since the holder-case is of a split construction made up of cover-casings, retaining cavities established in the holder-case rather than in the end-plates allows simple retaining cavity formation without resorting to a complex mold.

Further, for insertion of power modules, simple placement of power modules within the split construction cover-casing suffices. The difficulty of lining-up and inserting power modules into retaining grooves provided in end-plates of prior art power sources is eliminated, and assembly can be performed extremely easily.

Once a power module has been placed in a cover-casing, that power module is reliably held by retaining cavities. Therefore, even when bolting adjacent power modules for connection, rotation of bolts and power modules can be prevented. Further, by making positive and negative electrode terminals in different shapes and by forming their corresponding retaining cavities in different shapes, backwards insertion of each power module can also be prevented.

Finally, since retaining cavities are established in the split construction cover-casings and are easily formed, a wide variety of electrode terminal shapes can also easily be accommodated.

DETAILED DESCRIPTION OF THE INVENTION

Figure 2:
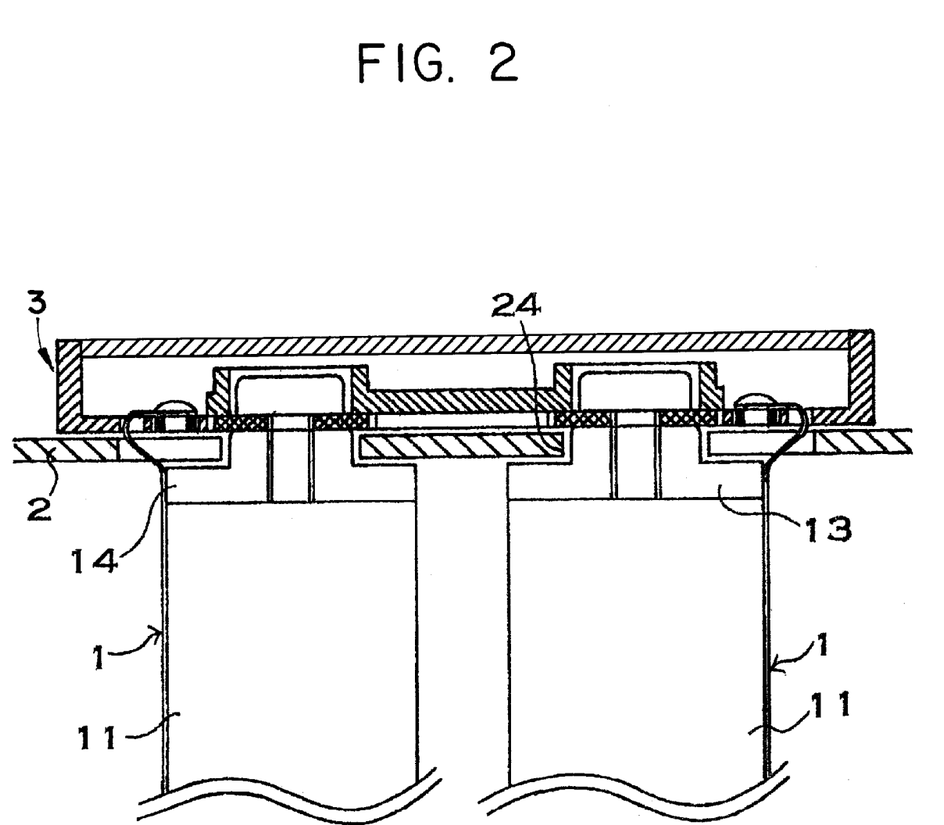
FIG. 2 is a cross-section view showing power module to end-plate connection for the power source of the present invention.
Figure 3:
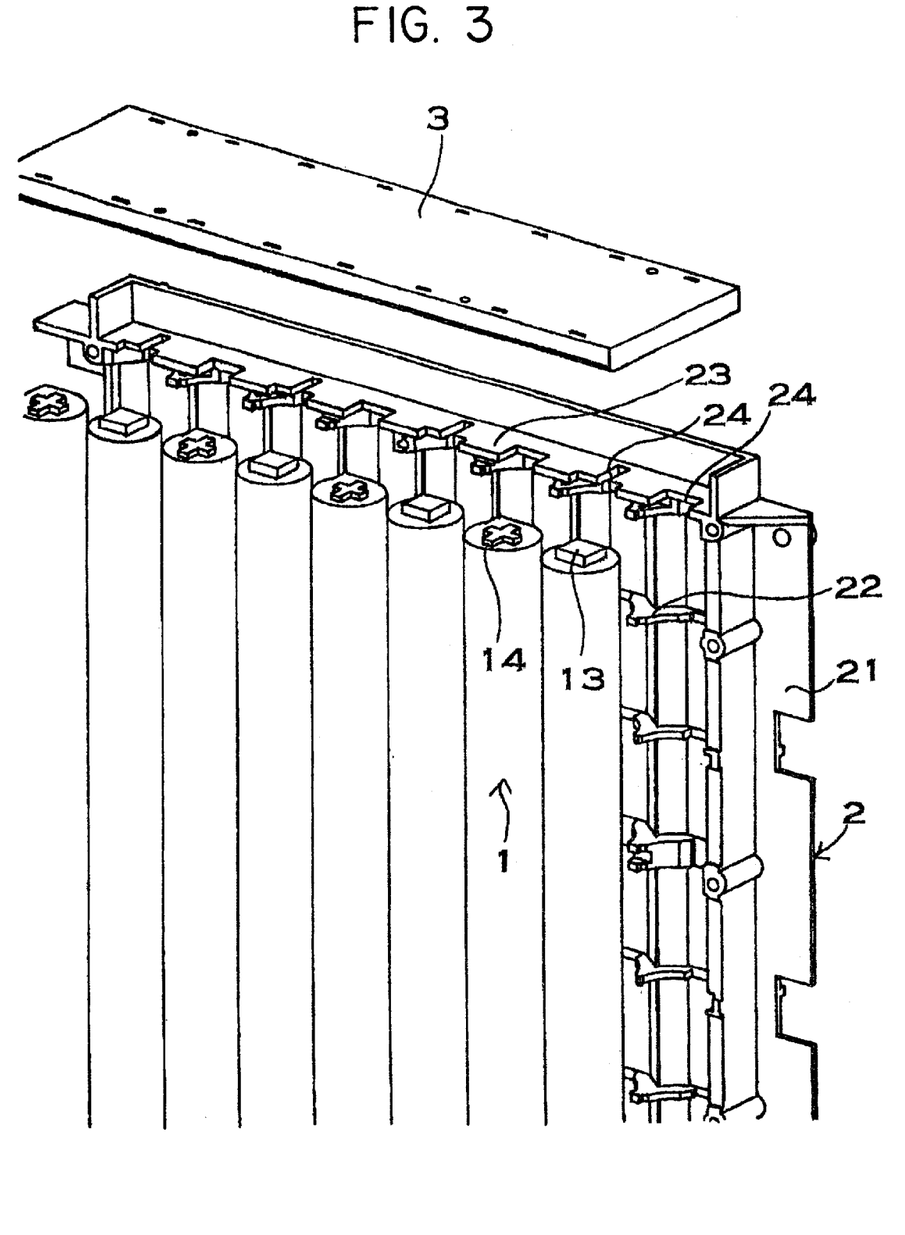
FIG. 3 is an exploded oblique view of the holder-case and power modules.

Embodiments of the present invention are described with reference to the drawings. As shown in FIGS. 2 and 3, the power source of the present invention is configured with power modules 1, a holder-case 2, and end-plates 3 which close off both ends of the holder-case 2.

Figure 5:
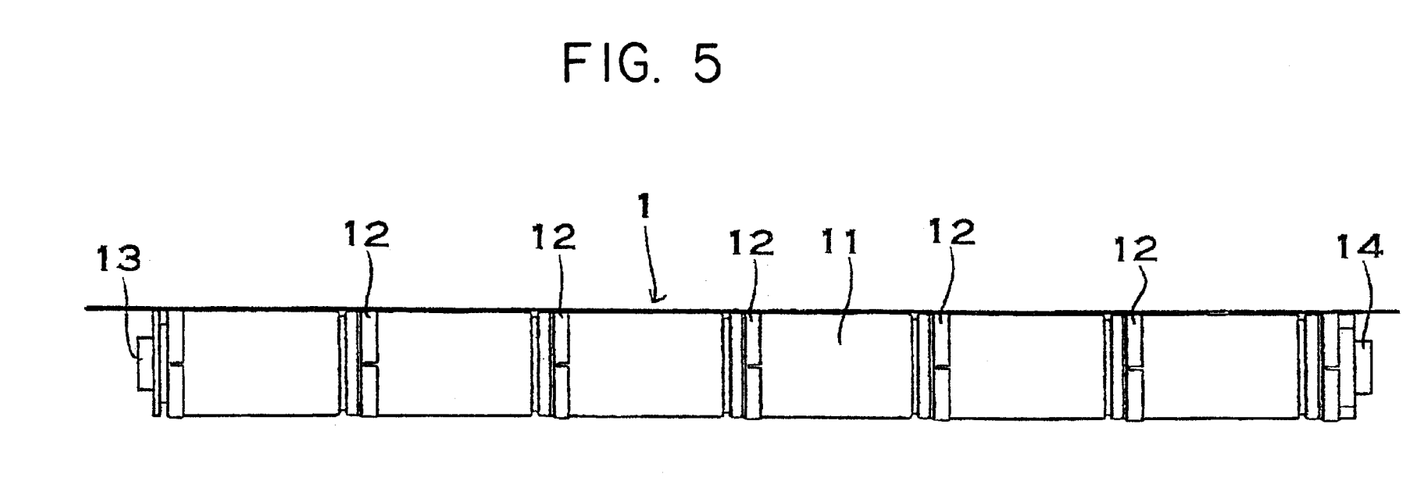
FIG. 5 is a side view of a power module.

As shown in the side view of FIG. 5, a power module 1 is constructed from six nickel-hydrogen batteries 11 lined-up in a row to form a column or stick-shaped power module. Dish-shaped connectors 12 are spot welded between each battery 11 to electrically connect the batteries in series. The ends of a power module are provided with a positive electrode and a negative electrode which are electrode terminals 13 and 14, each provided with a screw hole for connection.

The holder-case 2 has a split construction due to top and bottom cover-casings 21, and space for holding eight power modules placed in parallel is created. Eight rows of cavities conforming to the curved surfaces of batteries are formed on the inside surfaces of cover-casings 21 to hold power modules 1 in specified locations and ribs 22 crossing each row laterally are formed as a single piece with the cover-casings 21. The ribs 22 form peak-regions between corresponding valley-regions formed to retain adjacent power modules 1. The ribs 22 hold the power modules 1 in a manner that does not allow them to roll.

Figure 4:
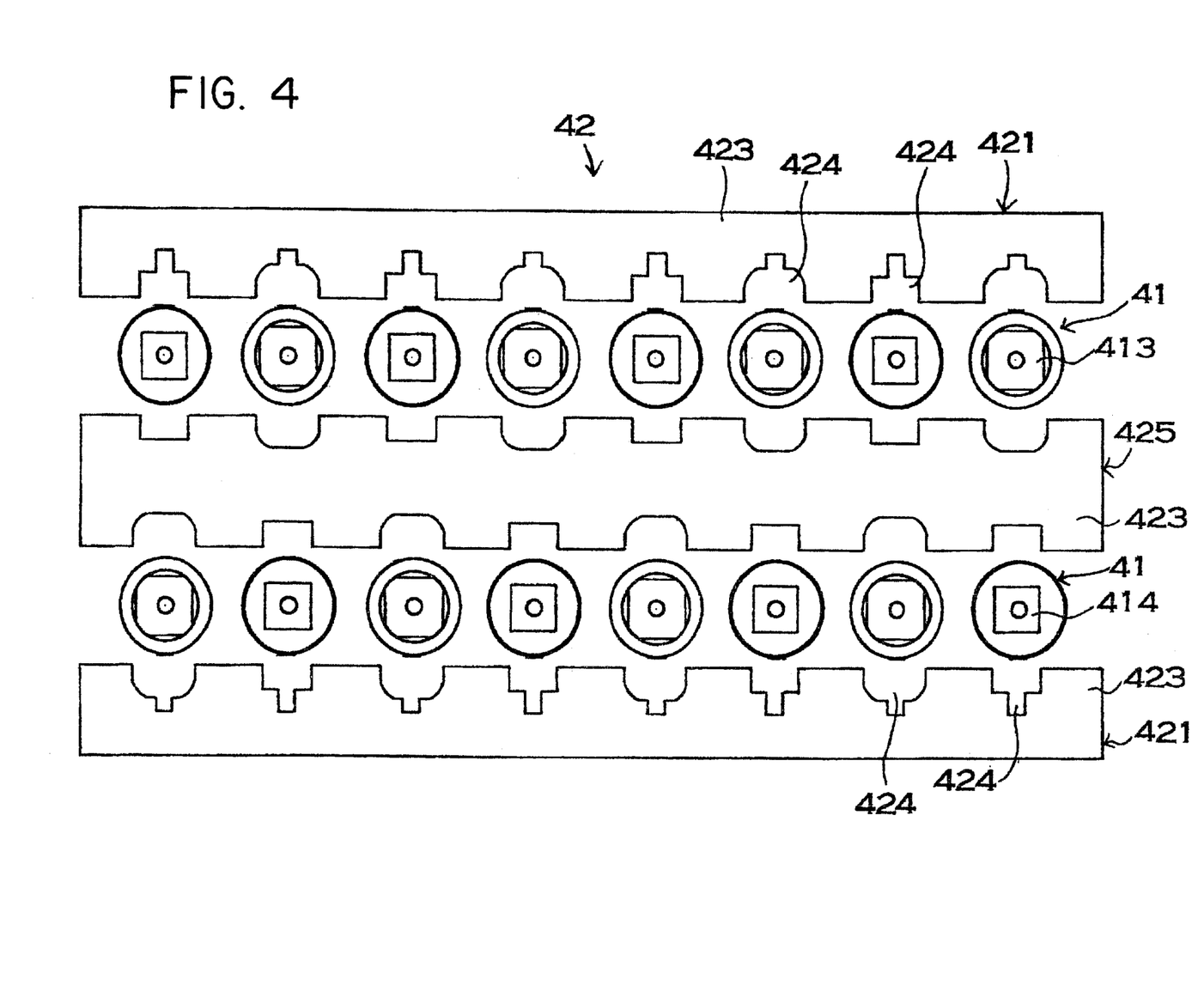
FIG. 4 is an exploded front view showing the holder-case and power module electrode terminals of another embodiment of the power source of the present invention.

As shown in FIG. 4, the holder-case can hold a plurality of levels of power modules 41 by inserting intermediate casings 425 between the split construction cover-casings 421. For example, by adding one intermediate-casing 425, holder-case 41 can accommodate two levels or 16 power modules 41. A holder-case 42 with two additional intermediate-casings 425 can retain three levels or 24 power modules 42. In this manner, the number of power modules 41 retained, the output voltage, and the capacity of the power source itself can be increased by adding intermediate-casings 425 to the holder-case 42. In this case, as a plurality of power module 41 levels are piled up, structures such as ribs are formed on intermediate-casings 425 in the same manner as on cover-casings 421, and each power module 41 is held in a specified location. In addition, space is allocated between power modules 41 due to structures such as ribs and intermediate-casings. This space forms cooling pathways. Consequently, even batteries located near the central region of the power source can smoothly radiate heat, and degradation due to battery heating can be prevented before-the-fact. The holder-case of FIG. 4 shows a different embodiment than the holder-case shown in FIGS. 2 and 3. However, structural elements in the holder-case of FIG. 4, which are identical in the embodiment of FIGS. 2 and 3, are assigned the same part number except for the highest order digit.

The holder-case 2 cover-casings 21 are open at both ends, and power modules 1 are retained with electrode terminals 13, 14 exposed at both ends. Cover-casings 21 have holder ribs 23 established at both ends. Holder ribs 23 are provided at locations corresponding exactly to power module 1 electrode terminal 13, 14 locations when power modules 1 are placed in the cover-casings 21. Retaining cavities 24 are formed at eight locations in the holder ribs 23 to retain each electrode terminal 13, 14 of eight power modules 1. These holder ribs 23 are formed at equal intervals lined-up in the lateral direction, and are formed in shapes corresponding to the shape of each electrode terminal 13, 14 of the power modules 1.

Specifically, power module positive electrode terminals 13 and negative electrode terminals 14 have different shapes. For example, in the power module 1 electrode terminals shown in FIG. 4, positive electrode terminals 13 have a square shape and negative electrode terminals 14 are shaped like a plus sign. Since adjacent power modules 1 are disposed in opposite directions, positive electrode terminals 13 and negative electrode terminals 14 are arranged in an alternating fashion. Consequently, retaining cavities 24 to hold each electrode terminal are formed in an alternating fashion with square shaped cavities and plus sign shaped cavities corresponding to each electrode terminal.

A square shaped retaining cavity 24 can accept a positive electrode terminal 13, but cannot accept or retain a plus sign shaped negative electrode terminal 14. Conversely a plus sign shaped retaining cavity 24 can accept a negative electrode terminal 14, but cannot accept or retain a square shaped positive electrode terminal 13. Whether an electrode terminal can be retained or not is easily implemented by restricting the width and depth of a retaining cavity.

In this manner, each power module 1 positive electrode terminal 13 and negative electrode terminal 14 are made in different shapes, and retaining cavity 24 shapes are also made different to correspond to each electrode terminal shape. In this type of holder-case, backwards insertion of power modules 1 is prevented, and power modules 1 can be arranged in a cover-casing 21 without mistaking their direction.

Figure 6:
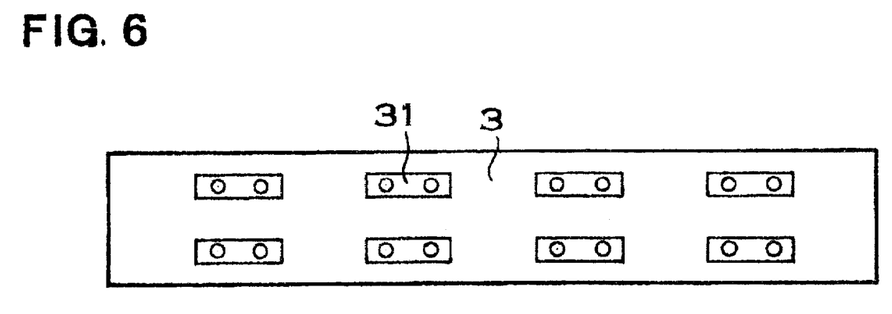
FIG. 6 is a plan view of an end-plate.
Figure 7:
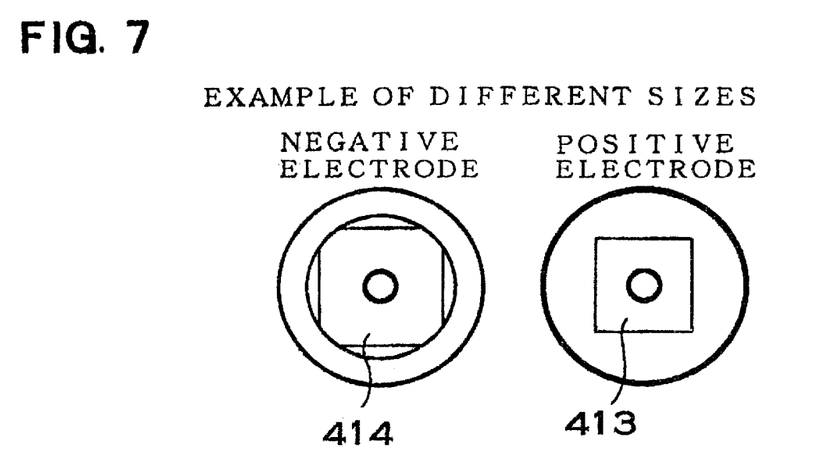
FIG. 7 is a plan view showing the power module electrode terminals shown in FIG. 4.
Figure 8:
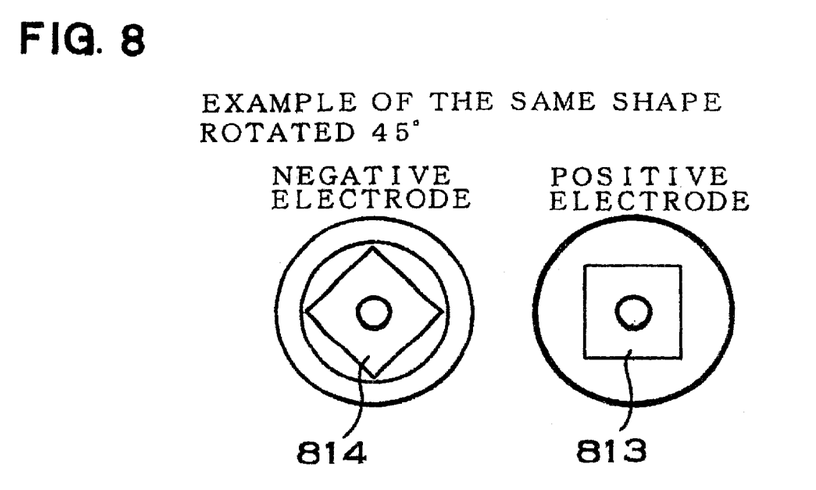
FIG. 8 is a plan view showing another example of power module electrode terminals.
Figure 9:
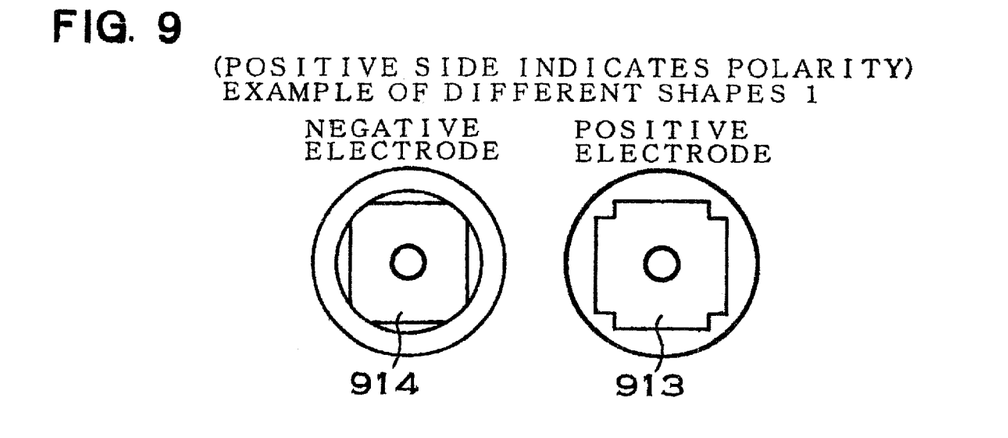
FIG. 9 is a plan view showing another example of power module electrode terminals.
Figure 10:
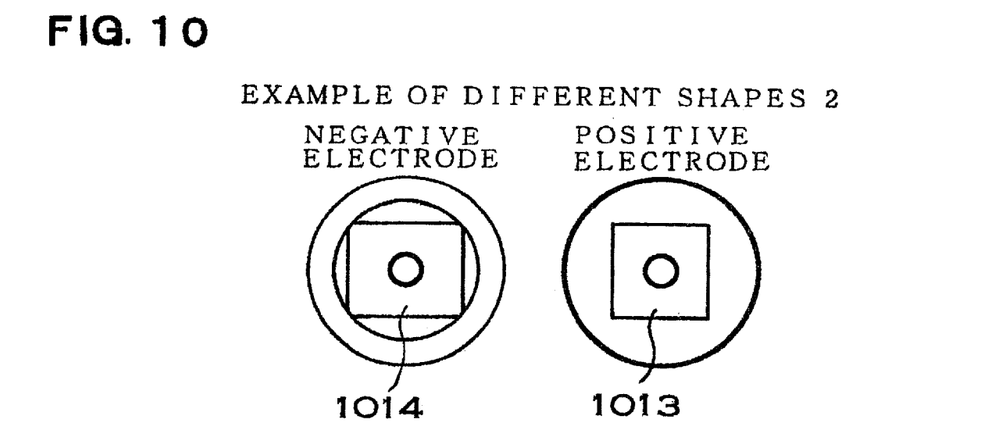
FIG. 10 is a plan view showing another example of power module electrode terminals.
Figure 11:
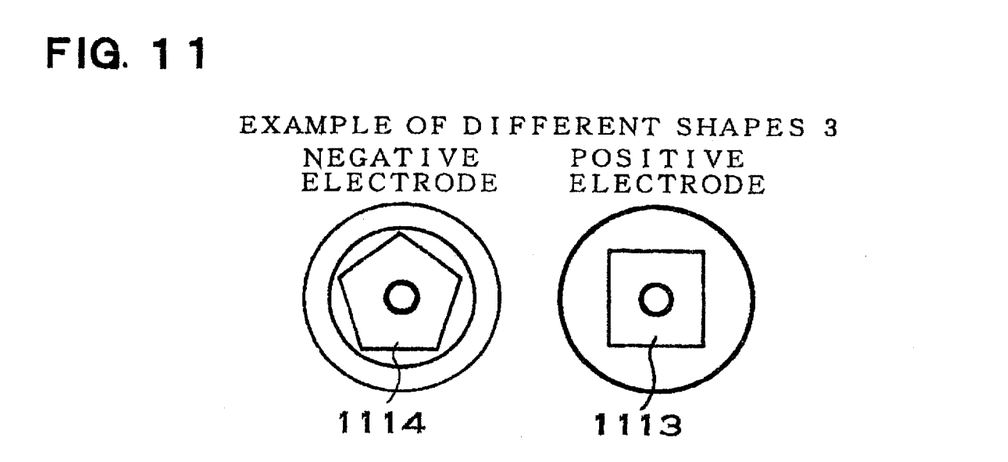
FIG. 11 is a plan view showing another example of power module electrode terminals.

Next, end-plates 3 close off open regions at both ends of the cover-casings 21. As shown in FIG. 6, the closed surface side of an end-plate 3 is an abridged planar surface with pass bars 31 disposed to connect adjacent power modules 1. Pass bars 31 have screw holes, which together with screw holes provided in each electrode terminal 13, 14, allow electrical connection of each power module 1 via bolting.

At this time, since each power module 1 electrode terminal 13, 14 is retained in a holder rib 23 retaining cavity 24, power modules 1 and bolts do not rotate during bolting, and bolting can be performed reliably.

Finally, power module 1 electrode terminal 13, 14 shapes are not restricted to square and plus sign shapes. As shown in FIGS. 7 through 11, electrode terminal shapes can be freely varied amount mutually different shapes setting corresponding retaining cavity dimensions such as width and depth such that electrode terminals are not mutually included. In FIGS. 7 through 11, 413 and 414, 813 and 814, 913 and 914, 1013 and 1014, and 1113 and 1114 indicated positive and negative electrode terminals respectively.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims or equivalence of such metes and bound thereof are therefore intended to be embraced by the claims.

What is claimed is:

1. A power source comprising:
   power modules formed in stick-shapes and provided with electrode terminals at both ends;
   a holder-case of split construction with cover-casings disposed on opposing sides of said power modules, holder ribs being established on at least one of said cover-casings; and
   wherein said holder ribs are established at at least a first end of said power modules, and retaining cavities are provided in said holder ribs and hold respective ones of said electrode terminals to prevent power module rotation.

2. A power source as recited in claim 1 wherein said cover-casing have cavities, conforming to curved surfaces of said power-modules, formed on their inside surfaces to accommodate said power modules at specified locations.

3. A power source as recited in claim 1 wherein said cover-casings have ribs formed as a single piece in a direction crossing the power modules, and said ribs form peak-regions between adjacent power modules where opposing valley-regions are formed.

4. A power source as recited in claim 1 wherein the holder-case has at least one intermediate-casing disposed between said cover-casings, and a plurality of levels of power modules are housed between said cover-casings and said at least one intermediate casing.

5. A power source as recited in claim 1 wherein space is provided between said power modules to form cooling passages in the holder-case.

6. A power source as recited in claim 1, wherein said holder ribs having said retaining cavities are established at both said first end and a second end of said power modules.

7. A power source as recited in claim 6 wherein said electrode terminals provided at both ends of each of said power modules include a positive electrode at one of said ends and a negative electrode at the other of said ends, the positive electrode and the negative electrode are formed of respectively different shapes, and said retaining cavities to hold the positive electrode and negative electrodes are also formed of different shapes.

8. A power source as recited in claim 1 wherein pass bars are connected to said electrode terminals of said power modules to interconnect said power modules.

9. A power source as recited in claim 8 wherein said electrode terminals have screw holes to connect to said pass bars.

10. A power source as recited in claim 1 wherein end-plates close off open regions at both ends of the holder-case.

11. A power source as recited in claim 10 wherein pass bars, which connect the electrode terminals of said power modules housed within the holder-case, are disposed on inside surfaces of the end-plates.

12. A power source as recited in claim 1, wherein each of said power modules comprises a plurality of batteries connected in a row in a lengthwise direction via connectors.

13. A power source as detected in claim 12, wherein said holder ribs having said retaining cavities therein are established at both said first end and a second end of said power modules.

14. A power source as recited in claim 1, wherein said respective ones of said electrode terminals are received in said retaining cavities of said holder ribs so that said electrode terminals are exposed through said retaining cavities.

15. A power source as recited in claim 1, wherein each of said power modules comprises a plurality of batteries electrically series-connected in a row in a lengthwise direction via spot-welded dish-shaped connectors.

16. A power source comprising:
   power modules formed in stick-shapes and provided with electrode terminals at both ends;
   a holder-case of split construction with cover-casings disposed on opposing sides of said power modules, holder ribs being established on at least one of said cover-casings; and
   wherein said holder ribs are established at at least a first end of said power modules, and retaining cavities are provided in said holder ribs and are shaped to engage complementarily shaped portions of said power modules to prevent rotation of said power modules.

17. A power source as recited in claim 16, wherein each of said power modules comprises a plurality of batteries connected in a row in a lengthwise direction via connectors.

18. A power source as recited in claim 17, wherein said holder ribs having said retaining cavities therein are established at both first end and a second end of said power modules.

19. A power source as recited in claim 16, wherein said holder ribs having said retaining cavities therein are established at both said first end and a second end of said power modules.

20. A power source as recited in claim 16, wherein each of said power modules comprises a plurality of batteries electrically series-connected in a row in a lengthwise direction via spot-welded dish-shaped connectors.

21. A power source as recited in claim 16 wherein said cover-casings have cavities, conforming to curved surfaces of said power modules, formed on their inside surfaces to accommodates said power modules at specified locations.

22. A power source as recited in claim 16 wherein said cover-casings have ribs formed as a single piece in a direction crossing the power modules, and said ribs form peak-regions between adjacent power modules where opposing valley-regions are formed.

23. A power source as recited in claim 16 wherein the holder-case has at least one intermediate-casing disposed between said cover-casings, and a plurality of levels of power modules are housed between said cover-casings and said at least one intermediate-casing.

24. A power source as recited in claim 16 wherein space is provided between said power modules to form cooling passages in the holder-case.

25. A power source as recited in claim 16 wherein pass bars are connected to said electrode terminals of said power modules to interconnect said power modules.

26. A power source as recited in claim 25 wherein said electrode terminals have screw holes to connect to said pass bars.

27. A power source as recited in claim 16 wherein end-plates close off open regions at both ends of the holder-case.

28. A power source as recited in claim 27 wherein pass bars, which connect the electrode terminals of said power modules housed within the holder-case, are disposed on inside surfaces of the end-plates.

* * * * *